United States Patent [19]
Hallstrom, Jr.

[11] Patent Number: 5,267,641
[45] Date of Patent: Dec. 7, 1993

[54] SELF-CLEARING RECIPROCATING CONVEYOR WITH MOVING BEARING SEAL

[76] Inventor: Olof A. Hallstrom, Jr., 1920 Hallstrom Rd., Tillamook, Oreg. 97141

[21] Appl. No.: 790,972

[22] Filed: Nov. 12, 1991

[51] Int. Cl.$^5$ .............................................. B65G 25/04
[52] U.S. Cl. .................................. 198/750; 414/525.1
[58] Field of Search ...................... 198/750; 414/525.1

[56] References Cited

U.S. PATENT DOCUMENTS 4,727,978 3/1988 Hallstrom, Jr. ................. 198/750 X Primary Examiner—D. Glenn Dayoan
Attorney, Agent, or Firm—Olson & Olson

[57] ABSTRACT

A reciprocating conveyor includes a plurality of elongated, load-supporting reciprocative slats mounted on a plurality of elongated, slat-mounting base members secured side-by-side across the supporting frame. Each reciprocative slat mounts a pair of elongated bearing members for reciprocative movement therewith, the bearing members configured to engage the base members to secure the reciprocating slat for reciprocative movement relative thereto, and are further configured to provide a seal thereagainst to restrict the passage of particulate material to the base members to a minimum, and also are configured to engage any such material that should escape the seal and enter the space beneath the reciprocating slat to continuously push said material toward and out of one end of the reciprocating conveyor with each successive movement of the reciprocating slat in that direction during operation of the conveyor.

8 Claims, 2 Drawing Sheets

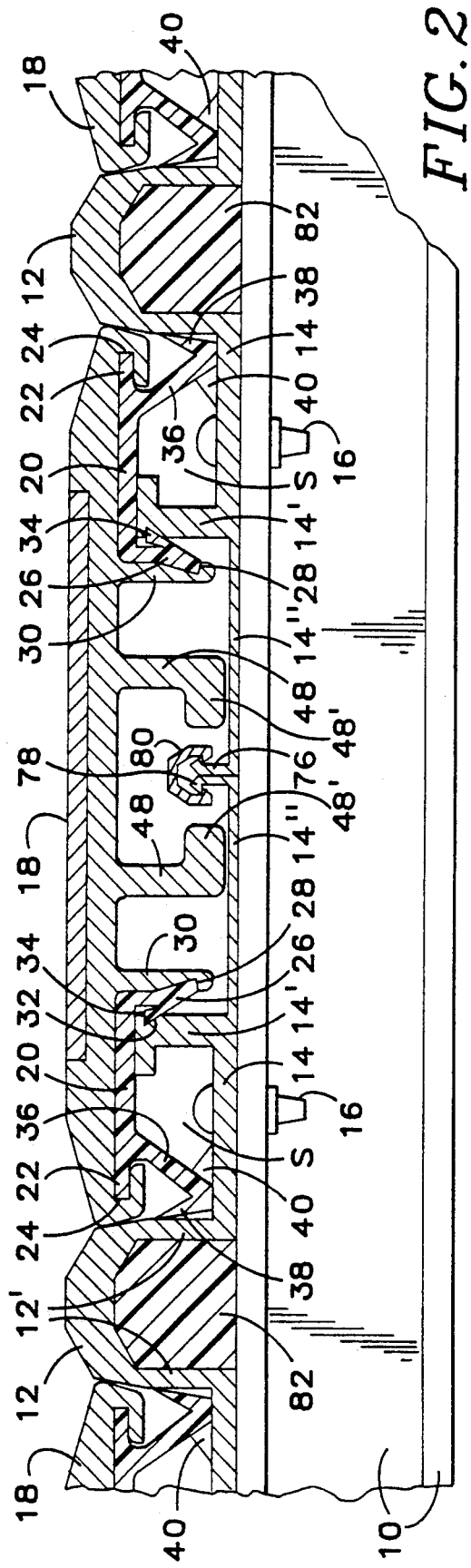
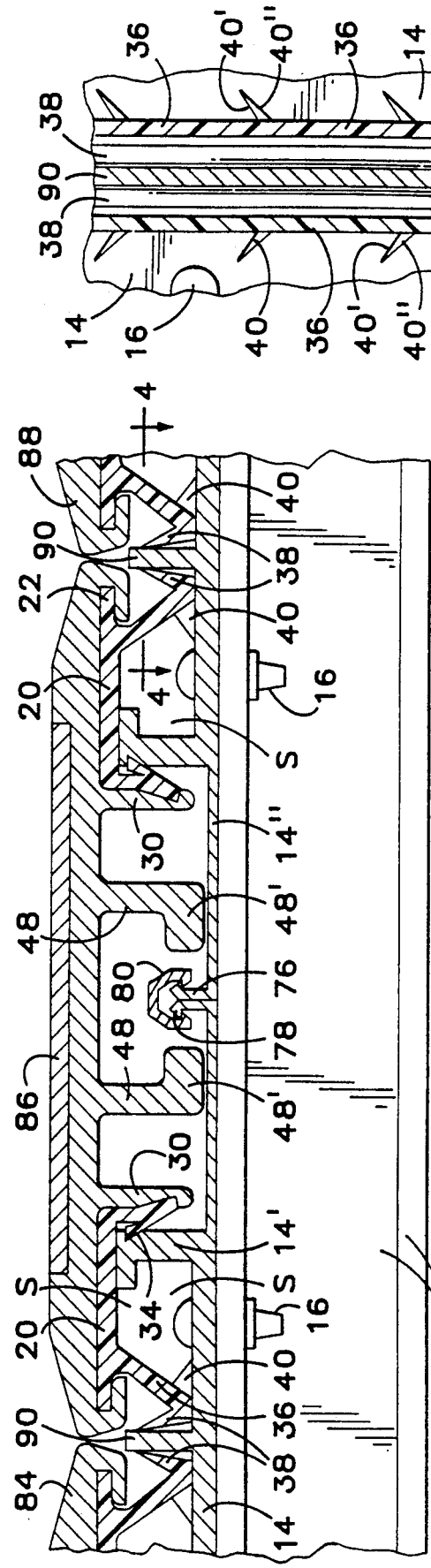

5,267,641

SELF-CLEARING RECIPROCATING CONVEYOR WITH MOVING BEARING SEAL

BACKGROUND OF THE INVENTION

This invention relates to reciprocating conveyors of the slat-type, and more particularly to a slat-type reciprocating conveyor that prevents the accumulation of particulate material in the confines beneath the reciprocating slats.

Many forms of slat-type reciprocating conveyors have been provided heretofore. Typical of these are disclosed in my U.S. Pat. Nos. 3,534,875; 4,143,760; 4,144,963; and 4,856,645; and my copending patent applications Ser. Nos. 07/603,058 filed 25 October 1990, entitled DRIVE CONNECTOR FOR RECIPROCATING CONVEYOR; and 07/628,517, Filed 17 December 1990, entitled WATERPROOF RECIPROCATING CONVEYOR.

Typical of these types of conveyor constructions, base members fixedly mount bearings which support the reciprocative slats for their longitudinal movement. These bearings have typically been provided in segments or lengths which require a very secure attachment to the base members and conventionally therefore have involved their being riveted to the base resulting in a significantly time consuming manufacturing step. Disassembly and replacement of worn or damaged bearings clearly presents the user with a laborious and time consuming maintenance operation.

While attempts have been made to prevent fine particles of material from sifting between the slats of reciprocating conveyors of this type, experience has invariably revealed that fine material does escape the seals and make its way to the space beneath the reciprocating slats. Continued accumulation of this material eventually results in packing beneath the moving slats and increases the friction surfaces against which the slats move, causing greater stress on moving parts, excessive wear, higher maintenance costs and otherwise unnecessary cleaning time and costs. These problems are only exacerbated further if liquids should also enter this material-containing space and mix therewith, forming sticky, gummy or corrosive slurries that can, given the right factors, potentially solidify into a state that requires much more than a routine cleaning operation to correct.

SUMMARY OF THE INVENTION

The reciprocating conveyor of this invention utilizes a slat assembly in which a plurality of elongated slat-mounting base members are spaced apart across a supporting framework, the base members mounting a plurality of elongated, longitudinally reciprocative slats each mounting low-friction bearing seals for movement therewith to slidably engage the base members for reduced friction and for restricting the passage of particulate material into the space beneath the reciprocating slat to a minimum amount of fine particulate material.

It is by virtue of the foregoing basic concept that the principal objective of this invention is achieved; namely, the provision of a slat-type reciprocating conveyor construction which overcomes the limitations and disadvantages of similar conveyor constructions of the prior art.

Another object of this invention is the provision of a slat-type conveyor of the class described which prevents the continued accumulation of fine material escaping the seal and collecting in the space beneath the reciprocating slats by removing such material on an on-going basis during operation of the conveyor.

A further object of this invention is the provision of a slat-type conveyor of the class described which may also utilize the novel structural features of my earlier inventions disclosed in my aforementioned patents and patent applications.

Another object of this invention is the provision of a slat-type conveyor of the class described which by utilizing a slat mounted bearing construction eliminates manufacture and assembly steps and time for economy and simplicity in manufacture, maintenance and repair.

The foregoing and other objects and advantages of this invention will appear from the following detailed description, taken in connection with the accompanying drawings of preferred embodiments.

BRIEF DESCRIPTION OF THE DRAWINGS

FIG. 2 is a fragmentary, transverse section taken on the line 2—2 in FIG. 1.

FIG. 3 is a fragmentary transverse section, similar to FIG. 3, showing an alternative slat and slat-mounting base assembly embodying the features of this invention.

FIG. 4 is a fragmentary sectional view taken on the line 4—4 in FIG. 3.

THE PREFERRED EMBODIMENTS

Figure 1:
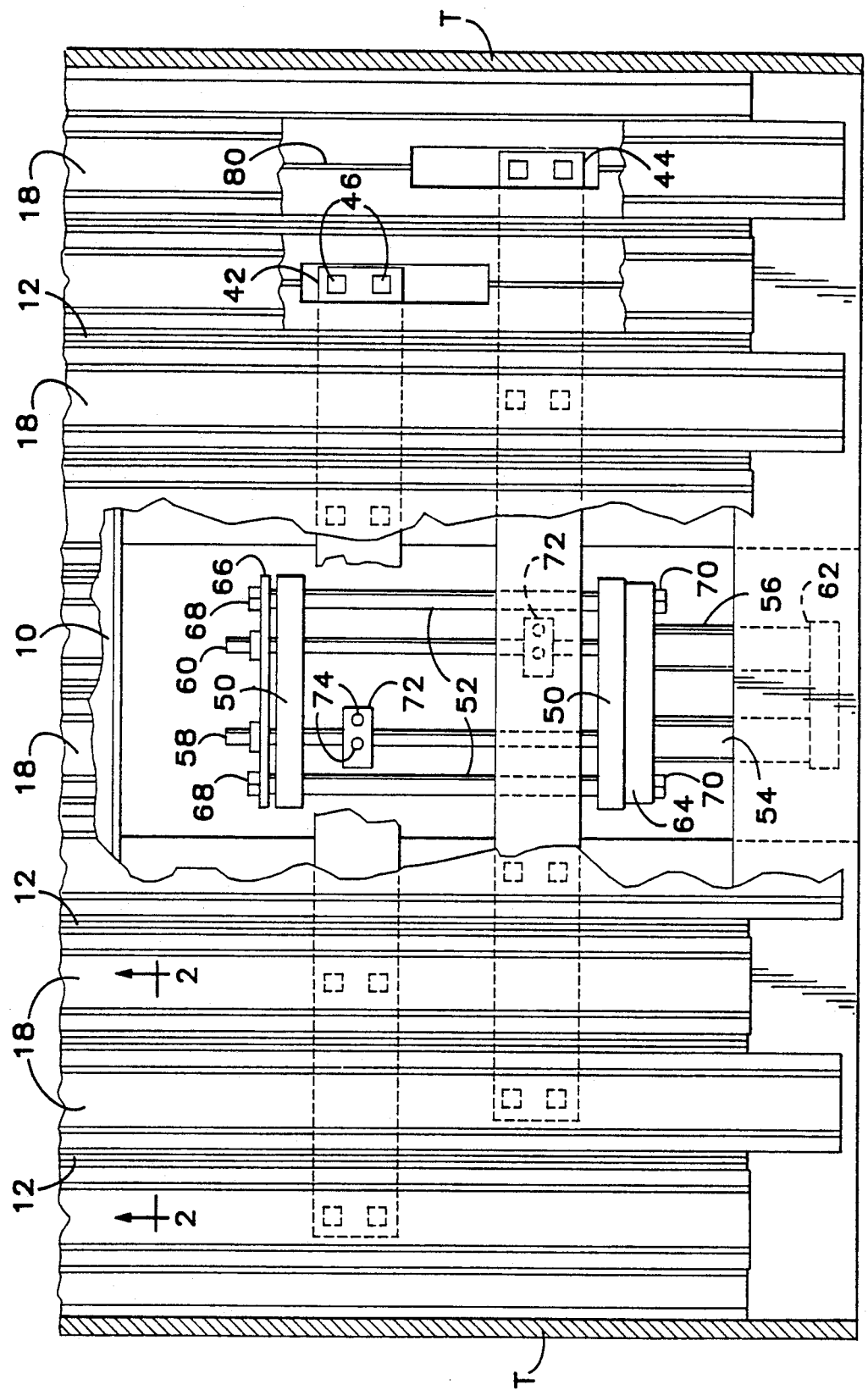
FIG. 1 is a fragmentary, plan view of a slat-type reciprocating conveyor embodying the features of this invention.

FIG. 1 illustrates the type of reciprocating conveyor disclosed in detail in my U.S. Pat. No. 4,856,645 and in my copending patent applications identified hereinbefore, and may similarly be integrated with a transport trailer (not shown) as I have earlier disclosed. In the same manner, a plurality of transversely extending frame beams 10 are secured in longitudinally spaced apart arrangement to a supporting base (not shown), and as described in detail in my aforementioned patent and applications, a plurality of elongated, fixed slats 12 are integrated with lateral base sections 14, as by metal extrusion. The base sections are mounted to the transverse beams 10 of the conveyor frame by suitable means, such as anchor rivets 16. The fixed slats are disposed in alternate arrangement with a plurality of elongated reciprocative slats 18. The reciprocative slats, which preferably also are formed of extruded metal, are coupled to bearing members 20 which are specially configured to provide the means by which a number of structural features of the conveyor of the present invention are realized, as will now be explained.

The bearing members are preferably extruded from synthetic resin or other suitable material having a low coefficient of friction, and are configured on one side with a tongue 22 to be received in a cooperatively configured groove 24 provided on each side of the reciprocative slat, as shown in FIG. 2. The tongue is secured fixedly in the groove by any suitable means such as friction fit, crimping, bonding, etc. The side 26 of each bearing member 20 opposite the tongue 22 is extended downward and angularly outward for snap fit seating of its lower end in a notch 28, in a flange 30 extending downwardly from the slat 18. The tongue 22 and side 26 effectively secure the bearing member to the underside of the slat. One elongated bearing strip, as shown, is mounted on each lateral side of each longitudinally elongated reciprocating slat, and preferably extends substantially the full length thereof.

As illustrated, the base 14 includes upstanding support rails 14' configured to provide a fixed supporting surface for the bearing surface of the bearing member 20 to ride upon. Also as illustrated, the support rail 14' includes a notch 32 configured to receive a projecting locking flange member 34 on the bearing member 20. As will be appreciated by those skilled in the art, during assembly of the conveyor each reciprocating slat 18 mounting the bearing members 20 is positioned between the fixed slats 12 and pressed downwardly, whereupon the projecting flange members 34, by virtue of their inherent resiliency, snap into engagement in their respective notches 32 in the support rail 14', thereby locking the reciprocating slats and bearing members in place against vertical movement while allowing their longitudinal reciprocative movement on the upstanding support rails 14'.

The bearing member 20 is also configured with a leg member 36 extending angularly downward and outward to the surface of the base 14 into space S between the base 14 and the underside of the reciprocating slat 18. As shown, the lower terminal end of the downwardly extending leg member 36 is configured with an angularly upward-extending seal tab 38 arranged to positively engage the confronting side wall 12' of the fixed slat 12, as shown in FIG. 2. By virtue of the outward tension supplied by the inherent resiliency of the seal tab against the wall 12' of the fixed slat, a sliding seal is formed which restricts passage of particulate material between the tab and the side wall to a minimum. Some particulate material however, usually in the form of dust and very fine grains, may, during extended operation of the reciprocating conveyor, be forced past the seal tab and ultimately enter the space S under the moving slat, where it will, if left unattended, accumulate.

As is apparent in viewing FIG. 2, a great deal of the surface area surrounding the space S is formed by the fixed base 14 and the fixed upstanding rail member 14'. Allowed to accumulate until the space S is filled, the entire moving surface area formed by the reciprocating slat 18, bearing member 20 and leg member 36 would be in frictional contact with a mass of material which is being held stationary by its frictional contact with the stationary surfaces of the base 14 and rail 14' surrounding the space. For this reason, the bearing member 20 preferably includes means to continuously move particulate material contained in the space S toward and out of one end of the elongated space under the reciprocating slat.

As illustrated in FIGS. 2 and 4, the downwardly extending leg member 36 mounts adjacent its lower end a plurality of tapered fin members 40 at longitudinally spaced apart intervals along its length. These fin members are secured by conventional means on the leg member to project angularly therefrom toward one end of the conveyor. This particular construction results in a structure that provides a "pushing" surface 40' in one direction of its travel through the space S and a sharply angled, "non-pushing" surface 40" in the reverse direction of its travel. Accordingly, longitudinal reciprocative movement of the moving slat 18 and its associated bearing member structure results in a continuous "shoveling/slicing" action of the fin members through the space S, constantly moving any particulate material toward the end of the conveyor with each successive stroke of the reciprocating slat in that direction. A collection container (not shown) may be arranged at the terminal end of the conveyor to catch the particulate material as it is exhausted out of the space beneath each reciprocating slat at the end of the conveyor.

With the individual reciprocative slat construction and related structure having now been described, it is to be understood that the reciprocating conveyor contains a plurality of laterally spaced longitudinally extending reciprocative slats arranged in groups, and each group is connected to a different transverse drive beam. In the embodiment illustrated in FIG. 1 there are two groups of reciprocative slats and therefore two drive beams 42 and 44.

As illustrated, the reciprocative slats 18 are releasably attached to their associated transverse drive beams 42 and 44 by clamp bolts 46, the enlarged heads of which are received in the slot formed between the inturned bottom ends 48' of angle clamp brackets 48, as described in detail in my aforementioned patent application entitled DRIVE CONNECTOR FOR RECIPROCATING CONVEYOR.

Also as described in detail in that patent application, the power drive for the slat-drive beams may be formed as a drive module. The drive module support frame is formed of a pair of transverse beams 50 spaced apart longitudinally by a pair of laterally spaced, longitudinally extending tubular beams 52.

Since the conveyor illustrated in FIG. 1 includes two drive beams 42 and 44, the power drive system includes two fluid pressure piston-cylinder drive units, preferably hydraulic, for operative association with the two drive beams. The cylinders 54 and 56 of the drive units are associated with cooperative piston rods 58 and 60, respectively. The cylinders of the drive units are joined at their head ends by a transverse connector beam 62 and at their rod ends by a transverse connector beam 64. Openings in the module beams 50 and beam 64 freely receive therethrough the piston rods extending from the cylinders, and a similar apertured transverse plate 66 freely receives the piston rods adjacent their outer ends. Elongated bolts 68 and 70 extend removably through registering openings in the transverse beams 50 and 64 and plate 66 and into internal threaded ends in the tubular beams 52 to clamp the power drive module removably to the module support frame.

Each piston rod is connected to its associated slat drive beam 42 and 44 by clamp blocks 72 which are provided with confronting half round grooves for receiving the piston rod, the clamp blocks being secured detachably together by clamp bolt 74, in the manner described in detail in the aforementioned patent application.

The moving bearing seal construction of this invention also provides an important improvement to my waterproof conveyor construction disclosed in my other patent application previously mentioned. As seen best in the embodiment illustrated in FIG. 2, each of the lateral base sections 14 mounting the fixed slats 12 is provided with lateral extensions 14" which terminate in an upwardly extending vertical flange 76. In the preferred embodiment illustrated, the upper end portion of each flange is provided with a lateral spur 78. Referring primarily to FIG. 2 of the drawings, the adjacent, substantially abutting sides of adjacent flanges 76 are interconnected by an elongated, substantially U-shaped flexible seal 80 which overlies and bridges the upper portions of the adjacent vertical flanges and is secured removably against inadvertent upward displacement by the spurs 78. The flexible seal is formed of water impervious synthetic resin, rubber or other suitable material that serves to join the vertical flanges together and form a watertight seal therebetween. Accordingly, it will be apparent that the seals 80 join all of the laterally associated base sections 14 and fixed slats 12 together to form a waterproof base which extends the full width of the conveyor frame.

It is also to be understood that in a waterproof application of the present invention, the fixed slat adjacent each of the opposite lateral sides of the conveyor are configured with a flexible side seal (not shown) which extends laterally into resilient abutment with the inner surface of the side wall T of a trailer, for example, to provide a watertight seal therebetween, as is described in detail in that patent application.

Liquid-impervious sealing plugs 82 are shown secured within the ends of the hollow fixed slats 12 to prevent liquid from entering thereinto, and a liquid collection receptacle (not shown) is provided in the reciprocating conveyor of this invention in accordance with the teachings in my aforementioned patent application.

FIG. 3 of the drawings illustrates the type of reciprocating conveyor described in my earlier U.S. Pat. No. 4,143,760, previously mentioned. This conveyor is formed of at least one group of at least three elongated slats 84, 86 and 88 which are mounted side-by-side on a conveyor frame for longitudinal reciprocation by a fluid pressure drive mechanism operated to move all of the slats of each group from a start position simultaneously in a load-conveying direction and then to move the slats of each group sequentially in the opposite direction from the advanced position back to the start position, all as described in detail in the aforementioned patent. In this embodiment, the fixed slats 12 (FIG. 2) are omitted, although an upstanding wall member 90 may be provided, as shown, to provide a fixed sealing surface against which the seal tab 38 may act as described in connection with wall 12' in FIG. 2. Alternatively, the wall member 90 may be omitted entirely, and adjacent seal tabs associated with adjacent reciprocative slats may be configured to engage each other directly in sealing contact, if so desired.

From the foregoing it will be apparent to those skilled in the art that various changes other than those previously described may be made in the size, shape, type, number and arrangement of parts described hereinbefore, without departing from the spirit of this invention and the scope of the appended claims.

Having thus described my invention and the manner in which it works, I claim:

1. A slat-type reciprocating conveyor, comprising:
   a) an elongated frame,
   b) a plurality of elongated, slat-mounting base members spaced apart across the frame and extending upwardly from the frame,
   c) a plurality of elongated load-supporting reciprocative slats supported on the base members for longitudinal reciprocation and having side edge portions extending laterally beyond said supporting base members and defining a space under said side edge portions,
   d) bearing means secured to each slat for reciprocation therewith, the bearing means being interposed between the associated reciprocative slats and the underlying base member for providing low friction sliding engagement with the base member,
   e) seal means on the bearing means under the associated slat extending laterally in the direction of the side edges of the slat and arranged to intercept particulate material falling from the lateral edges of the slats and inhibiting such particulate material from passing downward around said seal means into said space, and
   f) drive means supported by the frame and engaging said reciprocative slats for reciprocating them.

2. The reciprocating conveyor of claim 1 wherein the seal means on the bearing means of adjacent slats form a closure to intercept particulate material falling between the confronting side edges of the adjacent slats and inhibit such particulate material from passing downward around said seal means into said space.

3. The reciprocating conveyor of claim 1 wherein the base members include upstanding wall members aligned with the side edges of the associated slats for sliding engagement by the seal means.

4. The reciprocating conveyor of claim 1 wherein each reciprocative slat and associated base member forms an elongated, particulate material-collecting space therebetween, and material-engaging mover means is mounted on the bearing means for movement with the reciprocative slat and bearing assembly in said space to contact and move any particulate material contained therein in one longitudinal direction with each reciprocative movement of the slat and bearing assembly in said one direction.

5. The reciprocating conveyor of claim 4 wherein the material-engaging mover means includes a projecting leg portion on the bearing member configured to extend downward into the space-collecting space, and fin members secured at longitudinally spaced intervals along the length of the longitudinally elongated leg portion, the fin members having a surface disposed for engaging particulate material in said space and moving the material longitudinally in one direction with each corresponding reciprocative movement of the slat in said one direction.

6. A slat-type reciprocating conveyor, comprising:
   a) an elongated frame,
   b) a plurality of elongated, slat-mounting base members spaced apart across the frame and extending upwardly from the frame,
   c) a plurality of elongated load-supporting reciprocative slats supported on the base members for longitudinal reciprocation and having side edge portions extending laterally beyond said supporting base members and defining a space under said side edge portions,
   d) low friction bearing means interposed between the associated reciprocative slat and the underling base member,
   e) seal means on the bearing means under the associated slat extending laterally in the direction of the side edges of the slat and arranged to intercept particulate material falling from the lateral edges of the slat and inhibiting such particulate material from passing downward around said seal means into said space, and
   f) drive means supported by the frame and engaging said reciprocative slats for reciprocating them.

7. The reciprocating conveyor of claim 6 wherein the base members include upstanding wall members aligned with the side edges of the associated slats for engagement by the seal means.

8. A slat-type reciprocating conveyor, comprising:
a) an elongated frame,
b) a plurality of elongated, slat-mounting base members spaced apart across the frame,
c) a plurality of elongated load-supporting reciprocative slats supported on the base members for longitudinal reciprocation,
d) each reciprocative slat and associated base member forming an elongated particulate material-collecting spaced therebetween,
e) bearing means secured to each slat for reciprocation therewith, the bearing means being interposed between the associated reciprocative slat and the base member for providing low friction sliding engagement with the base member,
f) material-engaging mover means mounted for movement with each reciprocative slat and bearing assembly, the mover means including a projecting leg portion configured to extend downwardly into the material-collecting space, and fin members secured at longitudinally spaced intervals along the length of the longitudinally elongated leg portion, the fin members having a surface disposed for engaging particulate material in said space and moving the material longitudinally in one direction with each corresponding reciprocative movement of the slat in said one direction, and
g) drive means supported by the frame and engaging said reciprocative slats for reciprocating them.

* * * * *